United States Patent Office 3,595,669
Patented July 27, 1971

---

3,595,669
INSTANT COFFEE PRODUCT
Rudolf G. K. Strobel, Colerain Township, Hamilton County, Ohio, assignor to The Procter & Gamble Company, Cincinnati, Ohio
No Drawing. Filed Nov. 25, 1968, Ser. No. 778,758
Int. Cl. A23f 1/08
U.S. Cl. 99—71    11 Claims

ABSTRACT OF THE DISCLOSURE

Chelating agents are used as anti-scum and anti-foam additives for instant coffee. The chelating agents complex free polyvalent metal ions found in instant coffee dry components as well as the water used for reconstitution and thereby eliminate coffee cup scum and foam.

BACKGROUND

Instant coffee can be prepared in a number of ways. Most commonly it is manufactured by spray drying an aqueous coffee extract to produce a dry solid product in the form of tiny hollow granules. Instant coffee has gained substantial commercial acceptance in recent years, but still possesses a number of problems which require solution before a totally acceptable product will become available to the consumer.

One such problem which has been receiving some attention in recent years is the existence of coffee foam, an unsightly froth which forms on the surface of the coffee liquid when hot water is added to the instant coffee granules. One theory is that the foam is caused by air which is present within and between the instant coffee granules. The air forms a foam when entrapped by the addition of water and the foam apparently is stabilized by some natural constituent of the coffee. The foam will vary in amount from a layer which dominates the entire liquid surface to a thin ring or arc which attaches to the cup surface at the top of the coffee liquid. The problem is accentuated in many households by the failure of the consumer to use boiling water in preparing the coffee. When cooler water is used, the foam problem increases.

In addition, coffee foam is generally accompanied by a "scum" of insoluble materials which are either natural constituents of the coffee or which are produced during the production of the instant coffee. Either alone or in combination, the foam and scum present an unappetizing appearance which is undesirable for liquid coffee.

Several attempts have been made to find additives capable of solving the foam and scum problems. Such an additive for use in instant coffee must be capable of preventing the formation of the foam and scum, or else capable of eliminating them shortly after the addition of water. Further, the additive must not produce objectionable appearance, odor or flavor changes in either the dry product or the reconstituted coffee liquid.

Several recent attempts to solve the foaming problem are shown in Barch et al., U.S. Patent 2,929,716 issued Mar. 22, 1960, and Breivik et al., U.S. Patent 3,100,151 issued Aug. 6, 1963. The former patent suggests the use of $C_{12}$ to $C_{20}$ fatty acids or their salts as instant coffee defoamers, whereas the latter patent teaches the use of monoglycerides of fatty acids for the same purpose. Kellogg, U.S. Patent 2,564,332 discloses the addition of an emulsifying agent, preferably lecithin, as a means of reducing the amount of fatty materials floating on the top of a liquid beverage. While these prior art methods do offer satisfactory improvements, they have not proved to be wholly satisfactory for several reasons. Some of the prior art additives are not readily dispersible in water and therefore, if added prior to the drying operation, can produce instant coffee granules with an uneven distribution of defoamer which can lead to unpredictable results when the product is used. Further, some of the prior art additives are not highly effective at removing coffee scum and, when used at higher concentrations, they often produced a scum of their own on the surface of the coffee liquid. Additionally, the monoglyceride produces a more coarse foam rather than eliminating the foam entirely.

Bergeron et al., U.S. patent application Ser. No. 517,927, a copending and commonly assigned application, filed Jan. 3, 1966, relates to the use of hydrocarbon substituted polycarboxylic acids as defoaming and descumming agents.

All these prior art methods utilize dispersing agents as antifoam and antiscum additives. It has now been found that the use of chelating agents, as opposed to the prior art use of dispersing agents, is effective in removing foam and residual coffee scum.

Accordingly, it is the object of this invention to provide an improved instant coffee product.

It is a further object to provide a novel instant coffee product which produces little or no foam or scum when reconstituted with water.

It is a further object to provide a novel instant coffee product containing an additive which, at low concentrations, is capable of reducing coffee foam and scum when the instant coffee is reconstituted with hot water.

Still another object is to provide an instant coffee antifoam and antiscum additive which at its functional levels imparts no off flavor notes to the instant coffee.

These and other objects will become apparent from the following description and claims.

SUMMARY OF THE INVENTION

This invention relates to an improved instant coffee product. More specifically, it relates to a dry, water-soluble coffee extract which produces little or no coffee foam or scum when reconstituted with hot water.

The objects of this invention are achieved by providing an instant coffee containing a small but effective amount of a water soluble chelating agent.

If a molecule is to function as a chelating agent, it must fulfill two conditions. First it must possess at least two appropriate functional groups, the donor atoms of which are capable of combining with a metal atom by donating a pair of electrons. Secondly, these functional groups, generally speaking, must be so situated in the molecule that they permit the formation of a ring with a metal atom as the closing member.

Most specifically this invention comprises an instant coffee containing a small but effective amount of a water soluble chelating agent having a stability constant of at least 4.0. The instant coffee product of this invention is substantially free of coffee foam and scum problems when used with hot water to produce a reconstituted coffee liquid. Coffee foam and scum formation is curtailed and any foam or scum which does form is eliminated or substantially reduced in a short period of time, such as about one minute. It is essential that the stability constant be at least 4.0. If it is lower than 4.0, the chelating agent will not function as a suitable antifoaming and antiscumming additive. It has been found that those chelating agents having stability constants less than 4.0 must be added at such high levels that distinct adverse flavor effects are often created in the coffee beverage.

The stability constant is a common measure of the ability of a chelate to complex free polyvalent metal cations. The greater the stability constant the greater the complexing ability of the chelating agent. For a detailed explanation see "Mechanism of Inorganic Reactions"—Basdo & Pearson (2nd ed.), John Wiley & Sons, Inc., page 21, which is incorporated herein by reference.

DETAILED DESCRIPTION

The instant coffees contemplated for use in this invention are dry, granular, water-soluble coffee extracts prepared by any of a number of processes well known in the art. These instant coffee granules usually range in size from about $30\mu$ to about $400\mu$. The most common, and the type with the most serious foam problem, is conventional spray-dried instant coffee. While many variations are known, instant coffees of this type are prepared by extracting roast and ground coffee under pressure with hot water. For example, roast and ground coffee can be placed in a conventional extraction system and extracted at about 0 to 300 p.s.i.g. with about 150° F. to 375° F. water at a water to coffee weight ratio of about 1:1 to 3:1 to produce an aqueous coffee extract with a solids content of about 20% to about 35%, based on the weight of the liquid extract. The extract so obtained is filtered, often concentrated, cooled, and then spray-dried with, for example, 150° F. to 600° F. air at a pressure of about 50 to 4,000–10,000 p.s.i.g. The spray-dried granules formed are then screened to obtain the desirable size distribution (flavor and/or aroma boosters added if desired) and packaged for shipment and sale. The hollow granules formed by the conventional spray-drying process are conductive to air entrapment; consequently foam production is a particularly serious problem with spray-dried instant coffee. However, since similar problems do exist with instant coffee prepared by other methods, such as by foam, freeze or vacuum drying, these instant coffees are also within the scope of this invention.

The water soluble chelating agent is preferably selected from the group consisting of phytic acid and its alkali metal salts, ethylene-dinitrilo-tetra-acetic acid and its alkali metal salts, ethane hydroxy-diphosphonic acid and its alkali salts, nitrilotriacetic acid and its alkali metal salts, sodium tripolyphosphate, and nitrilotrimethyl phosphonic acid and its alkali metal salts. A highly preferred water soluble chelating agent embodiment of this invention is phytic acid and the alkali metal salts derived therefrom.

The most highly preferred instant coffee additives disclosed herein, as just mentioned, are phytic acid and alkali metal salts of phytic acid, for example the Na and K salts. Phytic acid is another name for inisitol hexaphosphoric acid which has the empirical formula $$C_6H_6[OPO(OH)_2]_6$$

and the structural formula shown below:

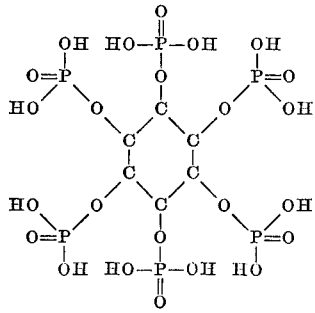

Phytic acid or its alkali salts, e.g. sodium and potassium salts, are most preferred for several reasons. First of all, phytic acid derivatives are present at a minimal level in all coffee. Secondly, phytic acid and its alkali metal salts are the most effective chelating agent at very low levels, as for example 23 p.p.m. of coffee extract. Thirdly, phytic acid and its alkali metal salts cause no negative flavor notes in the instant coffee.

Typical examples of other suitable chelating agents are those having a stability constant of 4 or above. It has been found that if the stability constant of the water soluble chelating agent is below 4, no noticeable decrease in scumming and foaming of the coffee will occur.

Suitable water soluble chelating agents having stability constants equal to or greater than 4 can be selected from the group consisting of iminoacetic acid derived compounds, amineacetic acid derived compounds and nitrilotriacetic acid and its alkali metal salts, ethylenediamine-N,N,N'N'-tetra(methanephosphonic acid) and its alkali metal salts, hydroxyproline and its alkali metal salts, pyridine-2,6-dicarboxylic acid and its alkali metal salts, 4-hydroxypyridine-2,6-dicarboxylic acid and its alkali metal salts, α-methyltropane admixed with 50% dioxane, β-methyl tropane admixed with 50% dioxane, uramil-N,N-diacetic acid and its alkali metal salts, biacetyloxine salicyloyl hydrazone, N-(2-hydroxybenzyl)diacetic acid and its alkali metal salts, trans-1,2-diaminocyclo butane-N,N,N',N'-triacetic acid and its alkali metal salts, ethylenediamine-N,N'-diacetic-N,N'-2-propionic acid and its alkali metal salts, and tetramethylenediamine N,N,N',N'-triacetic acid and its alkali metal salts.

Suitable iminoacetic acid derived compounds which can be employed as the water soluble chelating agent additives of this invention are N-2-hydroxyethylimino-diacetic acid and its alkali metal salts, N-2-mercaptoethyliminodiacetic acid and its alkali metal salts, N-2-sulphoethyliminodiacetic acid and its alkali metal salts, N-2-phosphoethyliminodiacetic acid and its alkali metal salts, N-methyliminodiacetic acid and its alkali metal salts, N-2-carboxylethyliminodiacetic acid and its alkali metal salts, N-(2-methoxyethyl)iminodiacetic acid and its alkali metal salts, N-(2-hydroxycyclohexyl)iminodiacetic acid admixed with 50% dioxane, N-(2-hydroxycyclohexyl)iminodiacetic acid and its alkali metal salts, N-(o-carboxyphenyl)iminodiacetic acid and its alkali metal salts, N-(m-carboxyphenyl)iminodiacetic acid and its alkali metal salts, N-p-(carboxyphenyl)iminodiacetic acid and its alkali metal salts, N-(2-hydroxy-5-nitrobenzyl)-iminodiacetic acid and its alkali metal salts, 2-2'-oxy-bis-[ethylimino di(acetic acid)] and its alkali metal salts, 2,2'-thio-bis[ethyliminodi(acetic acid] and its alkali metal salts, 2,2'-dithio-bis-[ethylimino(diacetic acid)] and its alkali metal salts, N-methyl-2,2'-imino-bis-[ethyliminodi(acetic acid)] and its alkali metal salts, 2,2'-oxy-bis-propyliminodiacetic acid and its alkali metal salts, and 2,2'-ethylenedioxy-bis-[propyliminodi (acetic acid)] and its alkali metal salts.

Suitable aminoacetic acid derived compounds which can be employed as the water soluble chelating agent additives of this invention are ethylenediamine-N,N-diacetic acid and its alkali metal salts, 1-amino-2-propanone-N,N-diacetic acid and its alkali metal salts, N'-(2-hydroxyethyl)ethylenediaminotriacetic acid and its alkali metal salts, N,N'-di-(2-hydroxyethyl)ethylenediaminodiacetic acid and its alkali metal salts, N,N,N',N'-tetra (phosphomethyl)cyclohexane-1,2-diamine, trimethylenediamine-N,N,N'-triacetic acid, 1,2-diaminopropane-N,N,N',N'-triacetic acid and its alkali metal salts, trans-1,2-cyclopentylenedi[aminodi(acetic acid)] and its alkali metal salts, pentamethylenediaminetriacetic acid and its alkali metal salts, o-phenylenediaminetic acetic acid and its alkali metal salts, N'-phenylethylenediaminotriacetic acid and its alkali metal salts, cis-cyclohexane-1,2-diaminotriacetic acid and its alkali metal salts, trans-cyclohexane-1,2-diaminotriacetic acid, cyclohexane - 1,3 - diaminotriacetic acid and its alkali metal salts, cyclohexane-1,4-diaminotriacetic acid and its alkali metal salts, diethylenetriamine - N,N,N',N', - propionic acid, N-(o-hydroxycyclo-hexylethylenediaminetriacetic acid), hexamethylenediaminotriacetic acid, 2,2-ethylene thio-bis-[propyliminodi(acetic acid)] and its alkali metal salts, N'-benzylethylenediaminetriacetic acid and its alkali metal salts, octamethylenedaminetriacetic acid and its alkali metal salts, and N,N'-dimethyl-2,2'-ethylenediamino-bis-[ethylaminodi(acetic acid)] and its alkali metal salts.

The preferred additives have already been set forth in a previous part of this specification and will not be repeated here. The compounds described above as typical instant coffee additives of this invention are generally not commercially available in bulk quantities at this time. However, they can be obtained from any of a number of chemical companies which prepare specialty chemicals upon request; or if desired, they conveniently can be prepared by a number of known chemical syntheses. For example, ethylenehydroxydiphosphonates, can be prepared according to the process of U.S. Patent 3,400,149 Quimby et al., which discloses a synthesis utilizing phosphorous oxide, acetic acid and water. The same or related preparations can be used to prepare other suitable coffee additives of this invention.

Acceptable, and often highly desirable, instant coffee additives within the scope of this invention can be made from materials derived from certain natural sources. For instance phytic acid is always present in green and roast coffees at very small levels and can be successfully isolated and concentrated according to a process shown in Rev. Pure and Applied Chemistry, vol. 16, pages 209–224 (1966) which is incorporated herein by reference. Phytic acid can also be extracted from other natural sources such as wheat bran, ground dried beans, carrot roots, parsnip roots and potato tubers.

While not wishing to be limited by any theory, it is believed the water soluble chelating agent antifoam and antiscum additives of this invention are effective principally because of their ability to remove polyvalent metal cations (for e.g. $Fe^{+++}$, $Ca^{++}$, $Mg^{++}$ which are present in the soluble coffee components and also the water employed in reconstitution), from the scum and foam forming ingredients of the coffee, like proteins, carbohydrates, and anionic lipids. The chelating agent forms a coordination complex with the metal ions at the center of that complex. Thus, free polyvalent metal cations are removed from the scum and foam forming coffee ingredients, thereby transforming the foam and scum into a soluble or dispersible state.

This method of instant coffee scum and foam removal represents a significant departure from the prior art approaches. For example, the previously cited Barch, Breivik and Kellogg patents and the Bergeron et al. application all show the use of fatty derived emulsifying agents. The use of the fatty derived materials shown by the prior art is principally directed at the problem of dispersing the droplets of oil and fatty materials which at times collect on the surface of a cup of instant coffee. The present invention is based upon the discovery that the coffee cup scum and foam is to a large extent eliminated by effective removal of free polyvalent metal cations by means of a chelating agent.

These additives can be used in combination with prior art emulsification additives or with other known additives. For example, phytic acid or its mono alkali metal salts, the most preferred water soluble chelating agent embodiment of this invention, can be used in conjunction with a phospholipid dispersing or emulsifying agent such as lecithin which is described in the above cited Kellogg patent. Besides lecithin which is shown in the Kellogg patent, the chelating agent additives can be used in combination with other well known glycerophosphatides or glycerosulfatides such as the cephalins, inositol phosphatides, sphingolipids, and cerebrosides. Other known emulsifiers which can be used in conjunction with the water soluble chelating agent additives are malic stearate, monoglycerides of fatty acids, $C_{12}$ to $C_{20}$ edible fatty acids and so forth.

In addition to having little tendency to form a "scum" of their own, the instant coffee additives of this invention have been found to exhibit significant coffee foam and scum reducing ability at concentrations as low as about 10 p.p.m. by weight of dry instant coffee. Concentrations of these additives above about 2000 p.p.m. by weight of the dry instant coffee will produce little if any additional benefit, and therefore, while concentrations in excess of this amount can be used, it is economically undesirable. The preferred range of usage is from about 20 to about 500 p.p.m. by weight of the dry instant coffee.

As mentioned previously, there is some phytic acid naturally present in coffee beans. The additive amounts used herein are in addition to those amounts already present in coffee in its natural state.

The instant coffee additives of this invention are readily dispersible in water; therefore, they can be added at any step during the production of the instant coffee. This is particularly beneficial in the preparation of spray-dried instant coffee. This is because the instant coffee additives can be added prior to the spray drying step, either before or after the extraction of the roast and ground coffee to reduce foaming problems during coffee processing, especially during spray drying. Foam which forms in the coffee extract prior to spray drying tends to clog pumps, reduce spray dryer capacity and, because of the increased volume, can necessitate the use of larger equipment. Addition of the instant coffee additives of this invention prior to spray drying greatly reduces this problem. In a preferred operation, phytic acid is added to an aqueous coffee extract having a solids content of from about 20% to about 35% based on the weight of the extract, and then spray dried. Another preferred method is adding the instant coffee additive to the spray-dried product prior to packaging, such as by spraying a solution or dispersion of the additive in liquid coffee or other carrier onto the spray-dried granules or by admixing the additive in solid form with the granules.

The following examples are given to demonstrate the effectiveness of the instant coffee additives of this invention when used to reduce coffee foam and scum in reconstituted coffee liquids. However, the examples are not intended to be limitations upon the invention but merely illustrative of specific embodiments. As mentioned previously, unless specified otherwise, parts per million of additives ratio are given with reference to the weight of the dry instant coffee used.

In evaluating the water-soluble chelating agent additives of this invention an arbitrary foam and scum scale ranging from 0 to 5 was chosen for measuring the coffee cup appearance. A high scumming and foaming decaffeinated product was given a foaming and scumming grade of 5 and was used as a standard for comparison. Thus a cup of coffee having excessive foaming tendencies was labeled 5 and a cup of coffee having no foam and/or scumming tendencies would be labeled 0. The higher the grade number given the more noticeable the scumming and foaming tendency; conversely the closer the grade number approaches 0 the lower the scumming and/or foaming tendency.

Example I

An extract of roast and ground coffee (30% by weight of coffee solids and water was prepared in the customary manner by extracting the coffee with hot water in a conventional extraction system. The extract was filtered, placed in a hold tank and allowed to cool to approximately room temperature. Thereafter, the extract was concentrated and spray-dried to give a conventional dry instant coffee product.

Phytic acid was obtained from a specialty chemical supplier and used in the following preparation.

A weighed amount of phytic acid, 69 milligrams, is admixed with 3 grams of instant coffee. This corresponds to 23 parts per million (p.p.m.) by weight of dry instant coffee. Thereafter the mixture is dissolved in 200 milliliters of distilled water at a temperature of 90° C. The water solution is stirred and after observation of the surface of the coffee a foam and scum grade is given. It was found that by the addition of 23 p.p.m. of phytic acid all foam and scum completely disappeared. The foam grade number was 0.

Other examples

Using the same test procedure and grade scale as described above, other chelating agents were added to dry instant coffee and the mixture dissolved. A chelating agent was added until all foam and scumming tendencies disappeared. Thus, the lower the number of p.p.m. required to eliminate foaming and scumming, the more effective and efficient was the chelating agent as an antifoaming and antiscumming additive. The following table shows the results of these additional tests. All of the data shown in the table were obtained by using the same procedure as described in Example I, i.e., 3 grams of instant coffee was admixed with designated quantities of the water soluble chelating agents. Thereafter the mixture was dissolved in 200 milliliters of distilled water at 90° C. The chelating agent weight level was continually increased until the minimum level to remove all foam and scum (on the foam and scum grade scale a grade of zero) was obtained.

TABLE I

| Example | Chelating agent used | Conc. of chelating agent (p.p.m.) | Scum and foam grade |
| --- | --- | --- | --- |
| II | Sodium phytate (purified) | 23 | 0 |
| III | Sodium phytate (commercial 40% pure) | 66.5 | 0 |
| IV | Ethylene dinitrilotetra-acetic acid | 66.5 | 0 |
| V | Ethylene hydroxy diphosphonic acid | 223 | 0 |
| VI | Disodium nitrilotriacetic acid | 50 | 0 |
| VII | Sodium tripolyphosphate | 40 | 0 |
| VIII | Nitrilotrimethyl phosphonic acid | 83 | 0 |

When in the above examples, the spray-dried instant coffee product is replaced by the foam-dried, freeze-dried and vacuum dried instant coffee products substantially similar results are obtained in that foam and scum on the surface of the liquid coffee can be eliminated or at least decreased significantly by the addition of a chelating agent antifoam and scum additive.

Besides the chelating agent additives shown in Example I and Table I foaming and scumming tendencies can be substantially eliminated by the addition of appropriate levels of chelating agents having a minimum stability constant of 4 and selected from those shown on pages 7, 8 and 9 of this specification.

When in the above examples the water soluble potassium salt chelating agents are employed rather than the sodium salts shown, substantially similar results are obtained.

Example IX

An extract of roast and ground coffee (30% by weight coffee solids in water) was prepared in the customary manner by extracting the coffee with hot water in a conventional extraction system. The extract was filtered and placed in a hold tank and allowed to cool to approximately room temperature.

Potassium phytate was obtained from a specialty chemical supplied and used in the following preparation.

In a smaller, separate hold tank, a 1% by weight water dispersion of the potassium phytate is prepared by simple mixing of a pre-measured amount of potassium phytate into a pre-measured amount of water at room temperature. A sufficient amount of potassium phytate dispersion is added to the coffee extract to provide a concentration of about 15 p.p.m., based on the weight of coffee solids in the extract. The coffee extract after being admixed with the potassium phytate water dispersion is pumped into a conventional spray-dryer by a piston pump. Spray-drying is accomplished at about 200 p.s.i.g., the air inlet temperature is about 550° F., and the air outlet temperature is about 150° F. The resultant product is spray-dried water soluble instant coffee product having potassium phytate evenly dispersed therein at a concentration of about 15 p.p.m.

The instant coffee product described above is used in preparing reconstituted coffee beverages and the foam and scum characteristics are compared to the "standard" and a grade is given according to the previously described scale. In the test, 3 grams of the instant coffee product is placed in a cup and 200 milliliters of distilled water at a temperature of 90° C. is added. The water solution is stirred and after observation of the surface of the coffee a foam grade number of 0 is indicated.

Substantial similar results are obtained when the sodium salt of phytic acid is employed in the above-described example. In addition, substantially similar results are obtained when ethylene dinitrilo-tetra-acetic acid and its alkali metal salts, ethanehydroxy-diphosphonic acid and its alkali salts, sodium nitrilo-triacetate and its alkali metal salts, sodium tripolyphosphate, and nitrilotrimethyl phosphonic acid and its alkali metal salts are employed.

What is claimed is:

1. An instant coffee containing a water-soluble chelating agent having a stability constant of at least 4.0 wherein the concentration of said chelating agent is from about 10 to about 2000 parts per million, based on the weight of the dry instant coffee.

2. The instant coffee of claim 1 wherein the concentration of the chelating agent is from about 20 to about 500 parts per million based on the weight of the dry instant coffee.

3. The instant coffee of claim 2 wherein the chelating agent is phytic acid.

4. The instant coffee of claim 2 wherein the chelating agent is sodium phytate.

5. The instant coffee of claim 1 wherein the instant coffee is spray-dried instant coffee.

6. The instant coffee of claim 1 wherein said chelating agent is selected from the group consisting of phytic acid and its alkali metal salts, ethylene-dinitrilo-tetra-acetic acid and its alkali metal salts, ethane-hydroxy-diphosphoric acid and its alkali metal salts, nitrilotriacetic acid and its alkali metal salts, nitrilotrimethyl phosphonic acid and its alkali metal salts, and sodium tripolyphosphate.

7. The instant coffee of claim 1 wherein said chelating agent is an alkali metal salt of phytic acid.

8. The method of reducing coffee foam and scum in reconstituted coffee liquids prepared from instant coffee products which comprises adding to the instant coffee from about 10 to 2000 parts per million of a chelating agent characterized by having a stability constant of at least 4.0.

9. The method of claim 8 wherein said chelating agent is selected from the group consisting of phytic acid and its alkali metal salts, ethylene-dinitrilo-tetra-acetic acid and its alkali metal salts, ethane-hydroxy-diphosphonic acid and its alkali metal salts, nitrilotriacetic acid and its alkali metal salts, nitrilotrimethyl phosphonic acid and its metal salts, and sodium tripolyphosphate.

10. The method of claim 9 wherein the concentration of said chelating agent is from about 20 to about 500 parts per million, based on the weight of the dry instant coffee.

11. The method of reducing coffee foam and scum which comprises adding to an aqueous coffee extract from about 10 to about 2000 parts per million of a chelating agent characterized by having a stability constant of at least 4.0, and then spray drying the aqueous coffee extract to obtain a soluble coffee product.

References Cited

UNITED STATES PATENTS

| | | | |
|---|---|---|---|
| 2,564,332 | 8/1951 | Kellogg | 99—71 |
| 2,975,056 | 3/1961 | Lombardi | 99—71 |
| 3,100,151 | 8/1963 | Breivik et al. | 99—71 |
| 3,420,673 | 1/1969 | Guggenheim | 99—71 |
| 3,436,227 | 4/1969 | Bergeron et al. | 99—71 |
| 3,458,319 | 7/1969 | Block et al. | 99—71 |

FRANK W. LUTTER, Primary Examiner

W. L. MENTLIK, Assistant Examiner